US011955296B2

(12) United States Patent
LaFountain et al.

(10) Patent No.: US 11,955,296 B2
(45) Date of Patent: Apr. 9, 2024

(54) ELECTRICAL SWITCH CONTACT SETS

(71) Applicant: GENERAL EQUIPMENT AND MANUFACTURING COMPANY, INC., Louisville, KY (US)

(72) Inventors: Robert L. LaFountain, Scottsburg, IN (US); Michael John Simmons, Louisville, KY (US)

(73) Assignee: GENERAL EQUIPMENT AND MANUFACTURING COMPANY, INC., Louisville, KY (US)

( * ) Notice: Subject to any disclaimer, the term of this patent is extended or adjusted under 35 U.S.C. 154(b) by 0 days.

(21) Appl. No.: 17/859,831

(22) Filed: Jul. 7, 2022

(65) Prior Publication Data

US 2022/0344109 A1 Oct. 27, 2022

Related U.S. Application Data

(63) Continuation of application No. 16/548,424, filed on Aug. 22, 2019, now Pat. No. 11,417,475.

(51) Int. Cl.
*H01H 1/20* (2006.01)
*H01H 11/04* (2006.01)
*H01H 36/00* (2006.01)

(52) U.S. Cl.
CPC .......... *H01H 1/2041* (2013.01); *H01H 11/04* (2013.01); *H01H 36/00* (2013.01); *H01H 2225/008* (2013.01)

(58) Field of Classification Search
CPC ........ H01H 1/2041; H01H 1/20; H01H 11/04; H01H 36/00; H01H 36/008; H01H 50/546; H01H 2225/008
USPC ..... 335/106, 88, 89, 97, 107, 127–128, 132; 200/8 A, 11 A, 18
See application file for complete search history.

(56) References Cited

U.S. PATENT DOCUMENTS 3,155,790 A 11/1964 Lemonnier
3,483,432 A * 12/1969 Neill ...................... H01H 51/12 361/115
3,864,652 A 2/1975 Zubaty et al.
3,892,934 A 7/1975 Richards et al.
(Continued)

FOREIGN PATENT DOCUMENTS

| | | | | |
|---|---|---|---|---|
| CN | 107731626 | * | 2/2018 | ........... H01H 50/641 |
| GB | 2588275 | | 4/2021 | |
| WO | 2012157057 | | 11/2012 | |

OTHER PUBLICATIONS

Translation of CN107731626 (Original document published Feb. 23, 2018) (Year: 2018).*
(Continued)

*Primary Examiner* — William A Bolton
(74) *Attorney, Agent, or Firm* — HANLEY, FLIGHT & ZIMMERMAN, LLC

(57) ABSTRACT

Electrical switch contact sets are disclosed. A disclosed example apparatus includes a movable platform having first and second contacts, where the first and second contacts electrically coupled via the movable platform, and a stationary portion having third and fourth contacts, where the movable platform is movable to bring the first and second contacts in contact with the third and fourth contacts, respectively, to simultaneously close a current path of an electrical circuit associated with the first, second, third and fourth contacts.

20 Claims, 8 Drawing Sheets

(56) References Cited

U.S. PATENT DOCUMENTS

| | | | | |
|---|---|---|---|---|
| 4,149,049 | A | 4/1979 | Long | |
| 4,395,608 | A * | 7/1983 | Eicker | H01H 13/063 200/43.07 |
| 4,540,963 | A | 9/1985 | Esterl et al. | |
| 4,745,383 | A | 5/1988 | Zovath et al. | |
| 5,310,971 | A | 5/1994 | Vial et al. | |
| 5,512,717 | A | 4/1996 | Magome et al. | |
| 5,541,561 | A * | 7/1996 | Grunert | H01H 89/06 335/16 |
| 6,753,491 | B1 | 6/2004 | Huang | |
| 7,009,128 | B1 | 3/2006 | Czarnecki et al. | |
| 7,208,693 | B1 | 4/2007 | Yu | |
| 8,159,321 | B2 * | 4/2012 | Bollinger | H01H 50/546 335/106 |
| 8,890,639 | B2 * | 11/2014 | Choi | H01H 36/00 335/133 |
| 9,053,880 | B2 | 6/2015 | LaFountain | |
| 9,691,559 | B2 | 6/2017 | Oh | |
| 9,964,189 | B2 | 5/2018 | Rodriguez Najera et al. | |
| 11,417,475 | B2 | 8/2022 | LaFountain et al. | |
| 2003/0210117 | A1 * | 11/2003 | Arnholt | H01H 51/2209 335/132 |
| 2003/0226748 | A1 | 12/2003 | Sasaki | |
| 2005/0231308 | A1 | 10/2005 | Kim | |
| 2006/0119455 | A1 | 6/2006 | Park | |
| 2008/0074216 | A1 | 3/2008 | Annis et al. | |

OTHER PUBLICATIONS

Intellectual Property Office of the United Kingdom, "Combined Search and Examination Report under Sections 17 and 18(3)," issued in connection with British Patent Application No. GB2012158.8, dated Feb. 4, 2021, 6 pages.

Intellectual Property Office of the United Kingdom, "Examination Report," issued in connection with British Patent Application No. GB2012158.8, dated Dec. 17, 2021, 4 pages.

Intellectual Property Office of the United Kingdom, "Examination Report under Section 18(3)," issued in connection with British Patent Application No. GB2012158.8, dated Apr. 26, 2022, 3 pages.

Intellectual Property Office of the United Kingdom, "Notification of Grant," issued in connection with British Patent Application No. GB2012158.8, dated Aug. 30, 2022, 2 pages.

United States Patent and Trademark Office, "Non-Final Office Action," issued in connection with U.S. Appl. No. 16/548,424, dated Aug. 31, 2021, 7 pages.

United States Patent and Trademark Office, "Final Office Action," issued in connection with U.S. Appl. No. 16/548,424, dated Jan. 20, 2022, 9 pages.

United States Patent and Trademark Office, "Notice of Allowance," issued in connection with U.S. Appl. No. 16/548,424, dated Apr. 6, 2022, 10 pages.

United States Patent and Trademark Office, "Corrected Notice of Allowability," issued in connection with U.S. Appl. No. 16/548,424, dated Jul. 20, 2022, 3 pages.

* cited by examiner

ELECTRICAL SWITCH CONTACT SETS

RELATED APPLICATION

This patent arises from a continuation of U.S. patent application Ser. No. 16/548,424, which was filed on Aug. 22, 2019. U.S. patent application Ser. No. 16/548,424 is hereby incorporated herein by reference in its entirety. Priority to U.S. patent application Ser. No. 16/548,424 is hereby claimed.

FIELD OF THE DISCLOSURE

This disclosure relates generally to electrical switches and, more particularly, to electrical switch contact sets.

BACKGROUND

Some known electrical switches used in industrial environments employ movable portions (e.g., movable subcomponents) that are moved to close or open an electrical circuit. In particular, a movable portion can be moved by an actuator or a force caused by a magnetic field. In some known implementations, the movable portion is coupled to an electrical braid (i.e., an electrical pigtail) so that a contact of the movable portion can be electrically coupled to a node in the electrical circuit.

The aforementioned electrical braid is subject to repeated and/or cyclical motion of the corresponding movable portion. Accordingly, the electrical braid must maintain electrical continuity and structural integrity during this motion. Some known electrical braids employ annealed copper wires and can require significant labor and cost for implementation and assembly. Moreover, these electrical braids can require time-consuming length adjustments for a specific application.

SUMMARY

An example apparatus includes a movable platform having first and second contacts, where the first and second contacts are electrically coupled via the movable platform, and a stationary portion having third and fourth contacts, where the movable platform is movable to bring the first and second contacts in contact with the third and fourth contacts, respectively, to simultaneously close a current path of an electrical circuit associated with the first, second, third and fourth contacts.

An example electrical switch includes first and second contacts mounted to a movable platform, where the first and second contacts are electrically coupled via the movable platform, and third and fourth contacts mounted to a stationary portion, where the movable platform is movable to bring the first and second contacts in contact with the third and fourth contacts, respectively, to simultaneously close a current path of an electrical circuit associated with the first, second, third and fourth contacts.

An example method includes coupling a movable platform to an electrical switch, the movable platform having first and second contacts, where the first and second contacts are electrically coupled via the movable platform, and aligning the first and second contacts to third and fourth contacts, respectively, of a stationary portion of the electrical switch so that the third and fourth contacts can be brought into contact with the first and second contacts, respectively, to simultaneously close a current path of an electrical circuit associated with the first, second, third and fourth contacts when the movable platform is moved.

Figure 1A:
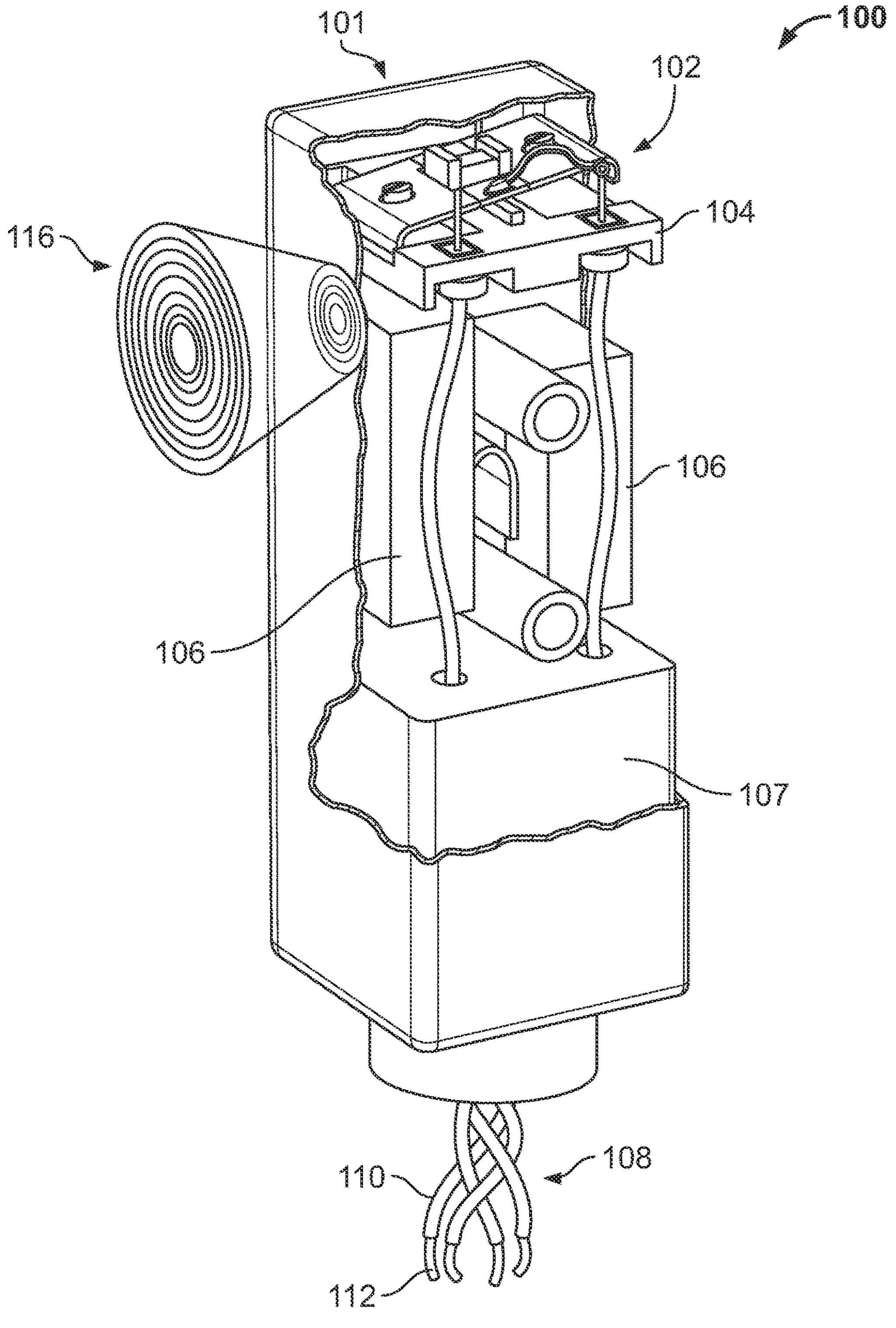
FIG. 1A (Prior Art)
FIGS. 1A and 1B illustrate a first known type of electrical switch.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Electrical switch contact sets are disclosed. In known electrical switches, electrical braids are sometimes employed to provide continuity to contacts of a corresponding movable portion to which the electric brads are coupled. Therefore, the electrical braids can be subject to movement of the movable portion. For the electrical braids to maintain electrical continuity and structural integrity during movement of the movable portion, annealed copper wires are typically employed. However, manufacturing, assembly, adjustment and implementation of these electrical braids can involve significant cost and labor.

Examples disclosed herein enable a cost-effective and reliable contact switch solution that can reduce and/or eliminate a need for the aforementioned electrical braids. Examples disclosed herein implement first and second contacts mounted to a movable platform or portion of a switch. In particular, the first and second contacts are moved along with the movable platform and brought into contact (i.e., electrically coupled) to third and fourth contacts, respectively, of a stationary portion of the switch to simultaneously close and/or complete a current path of an electrical circuit, which is associated with the first, second, third and fourth contacts. The first and second contacts are bridged and/or electrically coupled to one another via the movable platform. As a result, implementation of movable and/or flexible electrical items or components, such as an electrical braid, are not necessitated.

In some examples, the movable platform is moved by being rotationally pivoted about an axis. In some such examples, another circuit corresponding to other contact sets can be closed and/or completed when the first and second contacts are rotated away from the third and fourth contacts, respectively. In some examples, the movable platform is implemented as a plunger that moves along a linear motion path. In some examples, an actuator is coupled to the movable platform to cause movement of the movable platform. Additionally or alternatively, the movable platform is moved by a magnetic and/or electromotive force (e.g., moved by a magnet).

As used herein, the term "movable platform" refers to a component, assembly and/or device that moves within an assembly, a housing and/or a device. Accordingly, as used herein, the term "stationary portion" refers to a component, assembly and/or device that remains stationary relative to the assembly, the housing and/or the device. As used herein, stating that a circuit is "closed" or completed" means that an electrical circuit is at least partially closed (e.g., fully closed so that electrical current and/or signals can flow therethrough).

Figure 1B:
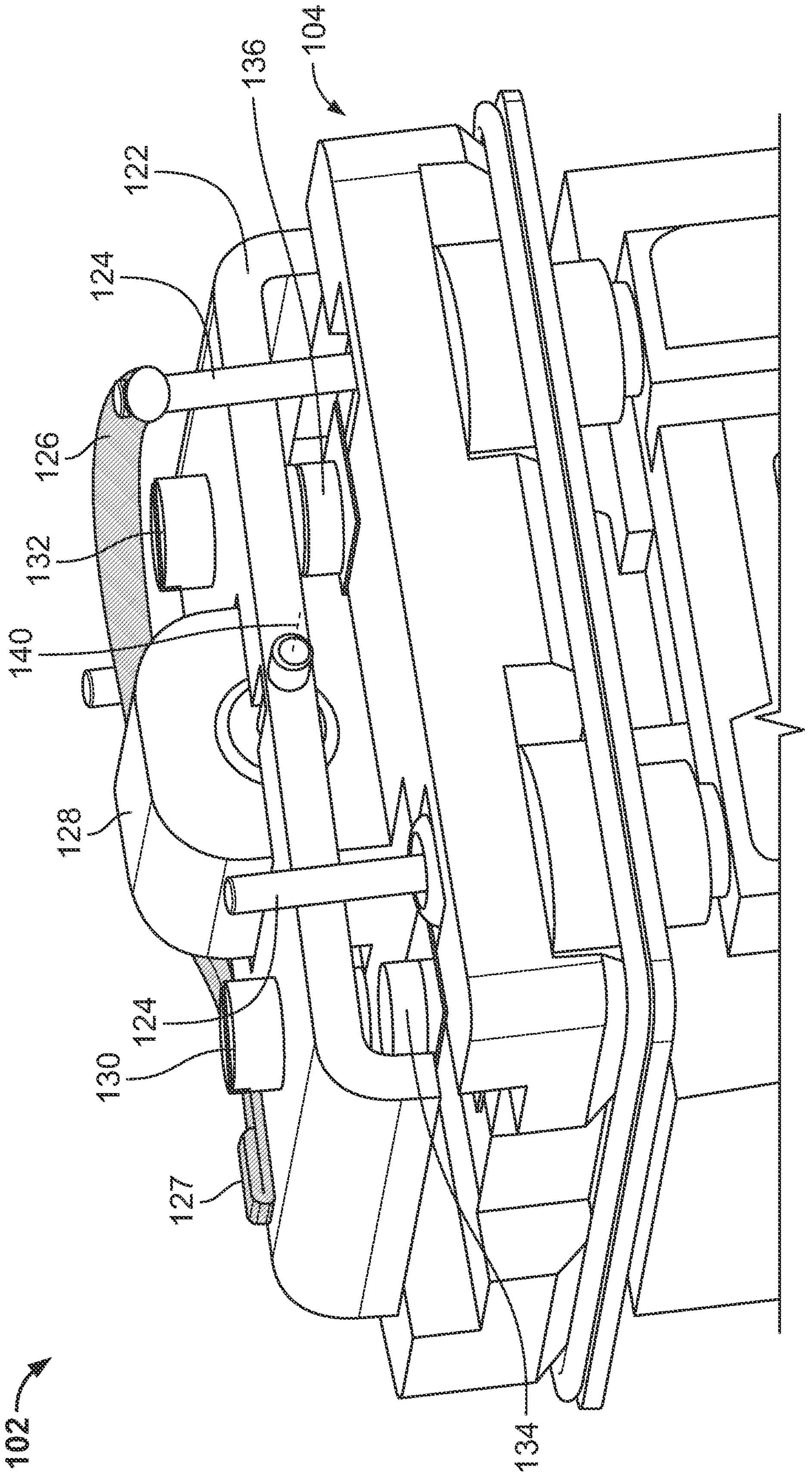
FIG. 1B (Prior Art)

FIGS. 1A and 1B illustrate a first known type of electrical switch 100. In particular, the electrical switch 100 functions as a proximity sensor. Turning to FIG. 1A, the known electrical switch 100 is shown in a cutaway view. The electrical switch 100 includes a housing 101, an armature assembly 102, a contact chamber 104, magnets 106, a potting fill 107 and a cable assembly 108, which includes wires 110 with exposed termination ends 112. In other known implementations, an electrical connector and/or terminal block is implemented instead of the cable assembly 108. Further, a sensing zone 116 is shown.

FIG. 1B is a detailed view of the armature assembly 102 of FIG. 1A. In the illustrated view of FIG. 1B, the contact chamber 104 is shown adjacent a movable platform 122. Further, the contact chamber 104 has support posts 124 extending and, in turn, an electrical braid 126 extends from one of the support posts 124. The electrical braid 126 is terminated at a termination end or coupling 127 disposed on the movable platform 122. In this known implementation, a pivot 128 enables rotational movement of the movable platform 122. Further, the movable platform 122 includes contacts 130, 132 while the contact chamber 104 includes contacts 134, 136.

In operation, a presence of a target (e.g., an external metallic object, an external magnet, a ferrous object, etc.) proximate to (i.e., within a requisite range of) the switch 100 and within the sensing zone 116 causes movement of the movable platform 122. In particular, the movable platform 122 is caused to rotate about a pivot axis 140 by a repulsive or attractive force corresponding to at least one of the magnets 106, thereby electrically coupling or de-coupling the contact 130 and the contact 134 to/from one another. Likewise, motion of the movable platform 122 electrically couples and de-couples the contact 132 and the contact 136. As a result of a seesaw-like motion of the movable platform 122, either a first circuit bridging the electrical braid 126 and the contact 134 is closed or a second circuit bridging the electrical braid 126 and the contact 136 is closed.

In contrast to the known example shown in FIGS. 1A and 1B, examples disclosed herein employ relatively simultaneous termination of multiple contacts together to complete and/or close an electrical circuit, thereby eliminating a need for the electrical braid 126. In other words, multiple contacts of a movable platform are simultaneously terminated together to close/complete a circuit such that a flexible electrical conductor does not need to be mechanically or electrically coupled to the movable platform.

Figure 2A:
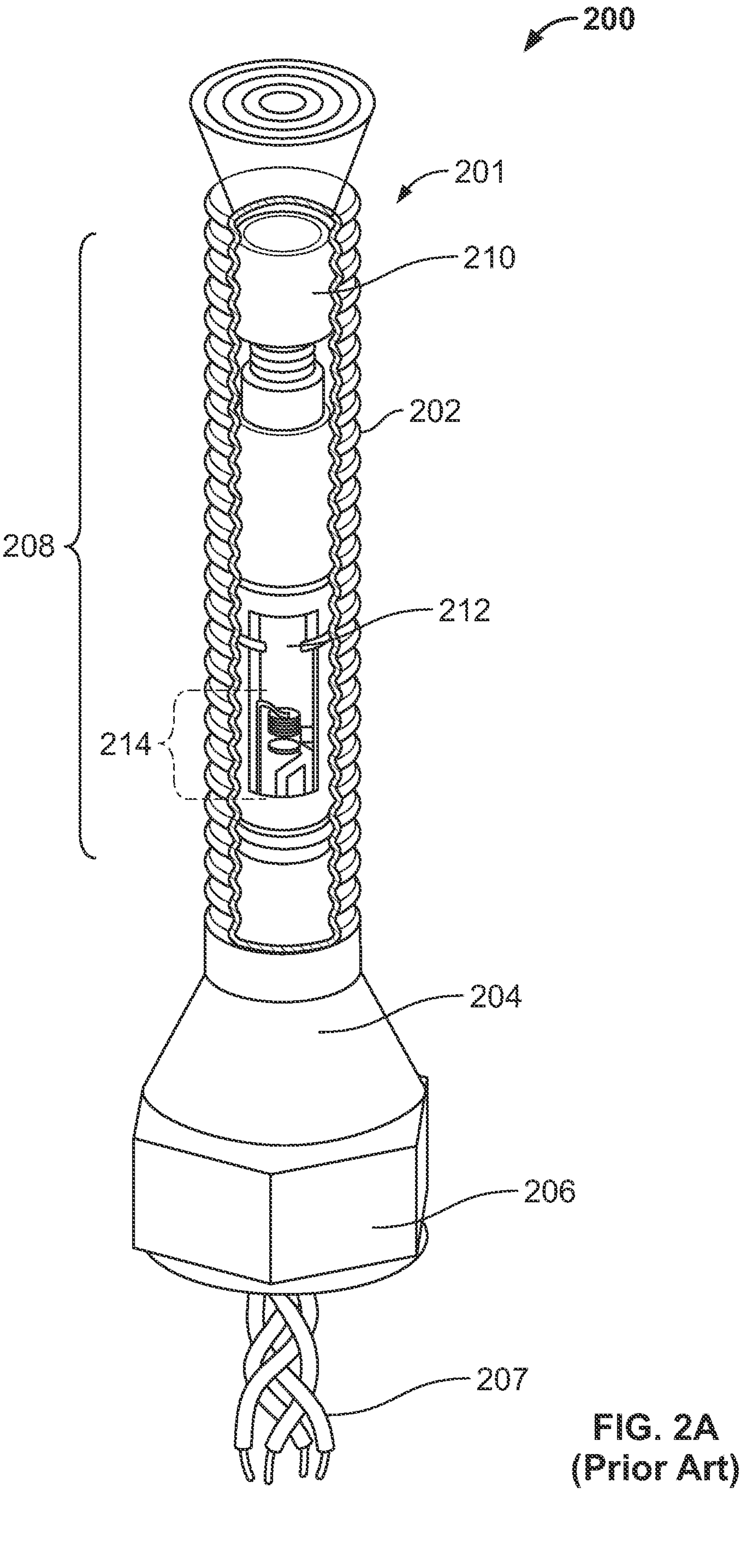
FIG. 2A (Prior Art)
FIGS. 2A and 2B illustrate a second known type of electrical switch.
Figure 2B:
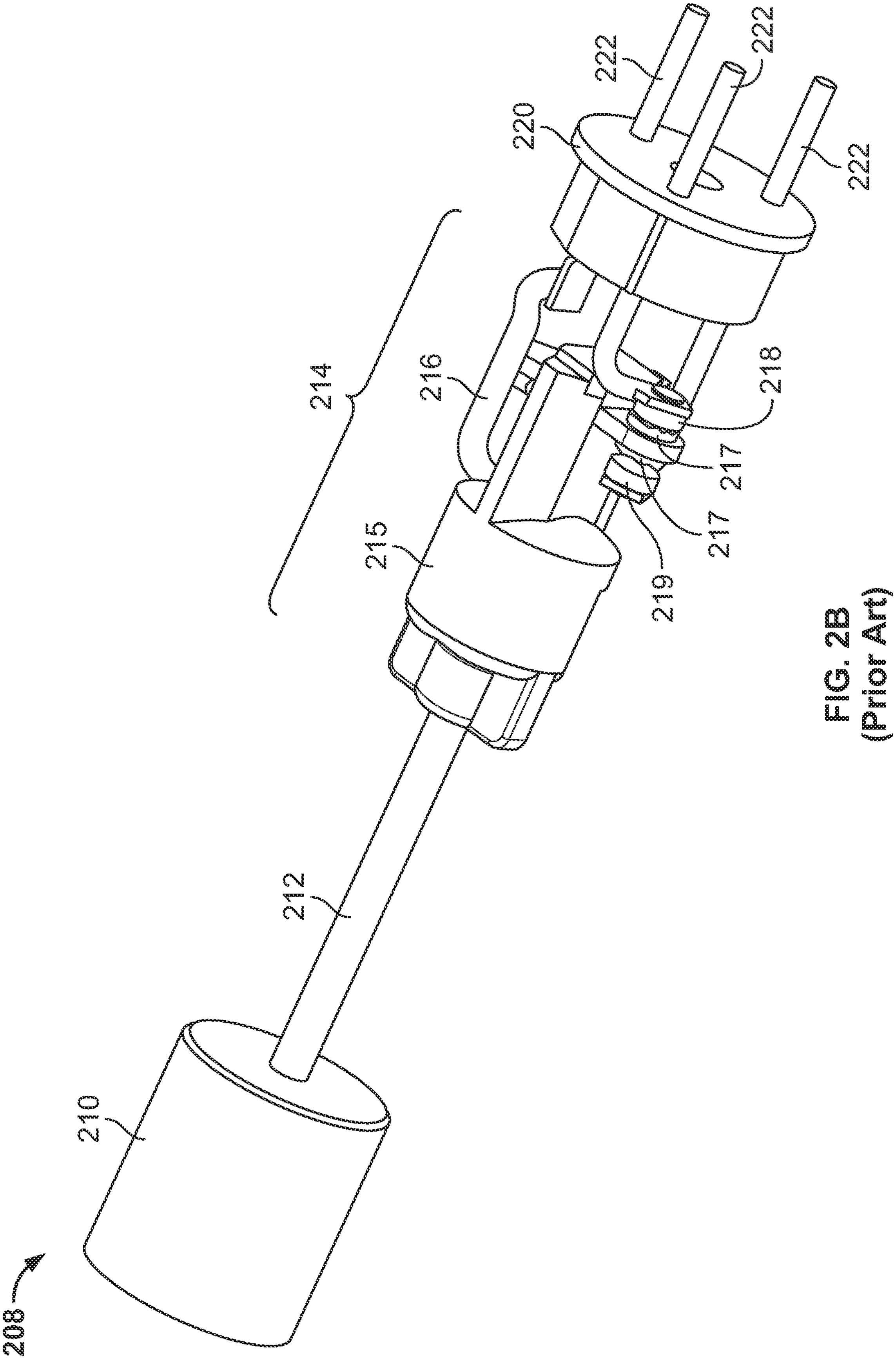
FIG. 2B (Prior Art)

FIGS. 2A and 2B illustrate a second known type of electrical switch 200. In particular, the electrical switch 200 functions as plunger-type proximity switch. FIG. 2A illustrates the electrical switch 200 in a cutaway view. The known electrical switch 200 includes a threaded portion 201 with threads 202, a body portion 204, a mount 206, a wire assembly 207 and a movable platform (e.g., a plunger assembly) 208. In other known implementations, an electrical connector and/or coupling is implemented instead of the wire assembly 207. The movable platform 208 includes a magnet 210, a movement shaft 212 and a switch portion 214.

FIG. 2B provides a detailed view of the movement platform 208 of the known electrical switch 200. In the illustrated view of FIG. 2B, the magnet 210 is shown mounted at a distal end of the shaft 212. Further, the movement portion 214 is shown including a base (e.g., a base structure) 215, electrical braids 216 (hereinafter 216*a*, 216*b*, etc.), and contacts 217, 218, 219. In this example, the electrical braid 216 and the contacts 217, 218, 219 are electrically coupled to socket contacts 222 that extend from a socket base 220.

In operation, the magnet 210 is displaced (e.g., linearly displaced) due to a presence of a target (e.g., an external metallic object, an external magnet, an external ferrous object, etc.), thereby causing the shaft 212 to move. As a result, the support structure 215 and the contact 217 is moved toward the contact 219. In this known implementation, the contact 217 is in contact with the contact 218 until it is moved by the support structure 215 toward the corresponding contact 219. Moreover, at least a portion of the braid 216 moves along with the support structure 215. Accordingly, like the braid 126 shown in FIG. 1B, the braid 216 must enable sufficient flexibility while maintaining structural integrity to maintain properly functioning electrical continuity.

Figure 3:
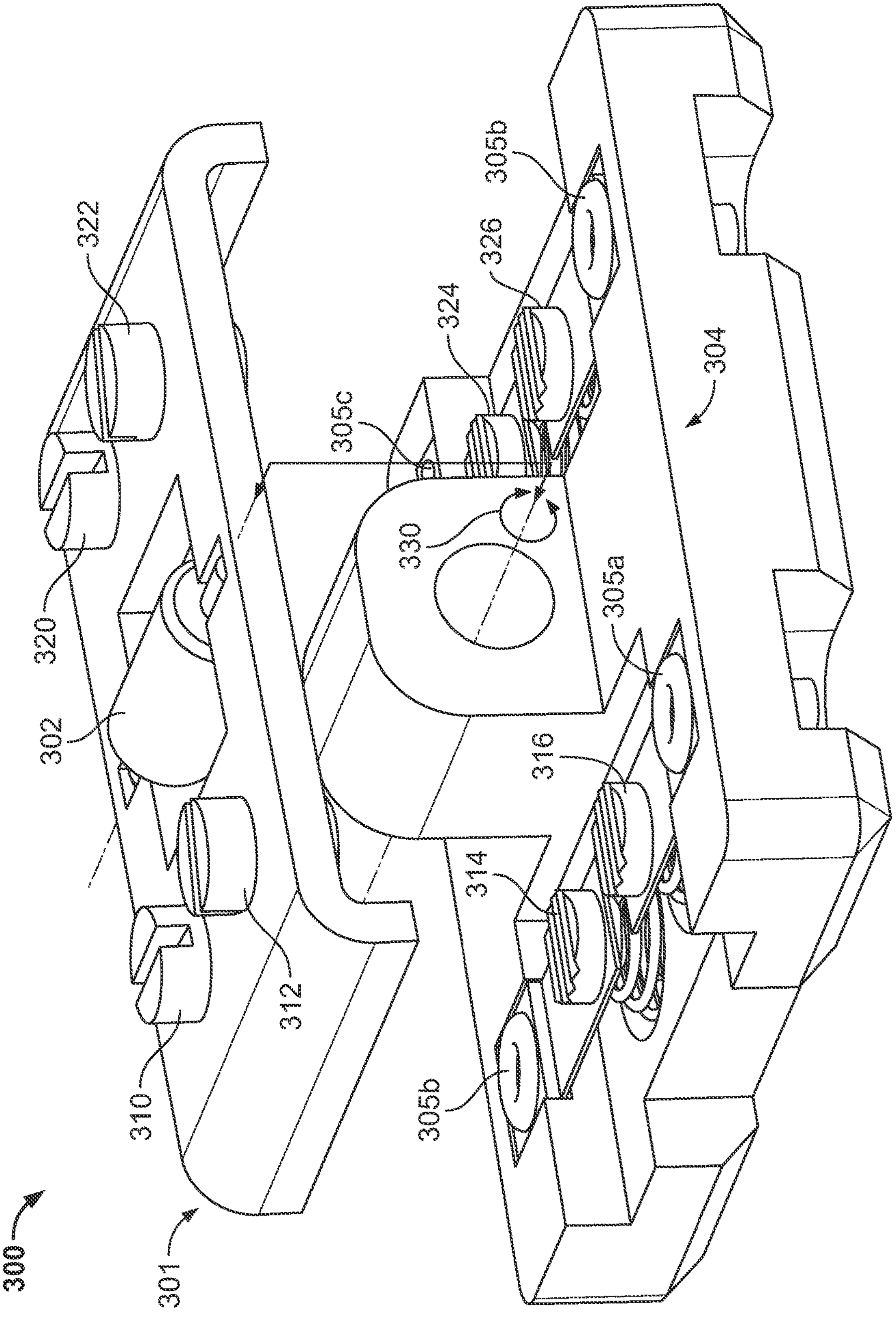
FIG. 3 illustrates an example electrical switch in accordance with teachings of this disclosure.

FIG. 3 illustrates an example electrical switch 300 in accordance with teachings of this disclosure. In particular, the example electrical switch 300 of FIG. 3 is shown in an exploded disassembled view for clarity. Similar to the known switch 100 of FIGS. 1A and 1B, the electrical switch 300 of the illustrated example is proximity-based such that an electrical switch is operated based on a detected presence of a target, such as an external magnet or a ferrous object (e.g., an object with sufficient mass of ferrous material), for example. The electrical switch 300 of the illustrated example includes a movable platform (e.g., an armature, a pivoting armature, etc.) 301, a pivot 302, a stationary portion 304 that is implemented as a contact chamber in this example, electrical contacts posts 305 (hereinafter 305*a*, 305*b*, 305*c*, 305*d*, etc.) and support posts 306. Further, the example movable platform 301 includes contacts 310, 312 mounted thereto. The example contacts 310, 312 are positioned proximate a first distal end of the movable platform 301. Further, in this example, the stationary portion 304 includes contacts 314, 316 mounted thereon, both of which are generally aligned with the respective mating contacts 310, 312.

To simultaneously close a current path of an electrical circuit defined by the contacts 310, 312, 314, 316, the movable platform 301 is caused to rotate about an axis 330 associated with the pivot 302. In this example, the movable platform 301 is caused to move by an external target being placed within a requisite proximity to the electrical switch 300. Accordingly, this rotation of the movable platform 301 causes the contact 310 to engage the contact 314, which is electrically coupled to the electrical contact post 305*b*, and, likewise, causes the contact 312 to engage the contact 316, which is electrically coupled to the electrical contact post 305*a*, thereby completing and/or closing an electrical circuit associated with the contacts 310, 312, 314, 316 and, thus, the associated electrical contact posts 305*a*, 305*b* as well. In the illustrated example, the contact 310 is electrically coupled to the contact 312 via the movable platform 301. In this example, the contact 310 is electrically coupled to the contact 314 at a similar time (e.g., simultaneously) with the contact 312 being electrically coupled to the contact 316. In some examples, the engagement (i.e., contact) of the contact 310 with the contact 314 and the engagement of the contact 312 with the contact 316 causes further motion of the movable platform 301 to cease. Additionally or alternatively, the engagement of the contact 310 with the contact 314 and the engagement of the contact 312 with the contact 316 causes a spring back force to act upon the movable platform 301, thereby restricting further movement of the movable platform 301. In other examples, the movable platform 301 translationally moves relative to the stationary portion 304.

In some other examples, the pivot 302 and/or the movable platform 301 is spring-loaded and/or biased to retain the movable platform 301 in a default rotational angle until the external target causes movement of the movable platform 301. In other words, in these other examples, the movable platform 301 can be biased to a default angular position until it is moved due to a presence of the external target. In some such examples, a torsional or linear spring can be implemented (e.g., at or disposed on the pivot 302).

In some examples, the movable platform 301 further includes the contacts 320, 322 while corresponding contacts 324, 326 are mounted to the stationary portion 304. In particular, the contact 320 is electrically coupled to the contact 322 via the movable platform 301 and, thus, the contacts 310, 312, while the contacts 314, 316, 324, 326 are electrically isolated from one another. In other words, the example movable platform 301 is electrically conductive. Moreover, in such examples, the contacts 320, 322 are positioned proximate a second distal end of the movable platform 301 that is on an opposite side from the aforementioned distal first end of the movable platform 301. In these examples, the contacts 324, 326 of the stationary portion 304 are generally aligned to be placed into contact with the moving contacts 320, 322. In particular, the movable platform 301 can move in a seesaw-like rotational motion about the rotational axis 330 to either electrically couple the contacts 310, 312 to the contacts 314, 316 or the contacts 320, 322 to the contacts 324, 326. Additionally or alternatively, the movable platform 301 is biased (e.g., rotationally biased, spring-biased, etc.) so that the contacts 320, 322 are biased into a default contact mode with the contacts 324, 326 until a presence of an external target causes the movable platform 301 to rotate. Alternatively, the contacts 310, 312 are biased toward the contacts 314, 316.

In some examples, the contacts 310, 312, 320, 322 are threaded into the movable platform 301, thereby defining an electrical contact therebetween. As a result, a height and/or displacement of ones of the contacts 310, 312, 320, 322 are adjustable relative to the corresponding contacts 314, 316, 324, 326 via rotation to accommodate part variation and/or tolerances, for example.

In some examples, at least one of the contacts 310, 312, 314, 316, 320, 322, 324 326 is at least partially composed of silver cadmium oxide, palladium silver, etc. However, any appropriate materials can be implemented instead. Additionally or alternatively, at least one of the contacts 310, 312, 314, 316, 320, 322, 324 326 is not plated or gold flashed. However, any appropriate plating, coating and/or material processing may be implemented instead. In some examples, an actuator (e.g., a motor, a solenoid, etc.) is coupled to the movable platform 301 and/or the pivot 302 to bias and/or positionally control movement of the movable platform 301. In some examples, pairs of the contacts 310, 312 and the contacts 320, 322 are bridged together and/or to one another via a component (e.g., an electrical bridge, an electrical sheet, a wire, etc.) mounted to and separate from the movable platform 301. In some such examples, the movable platform 301 is not electrically conductive.

Figure 4:
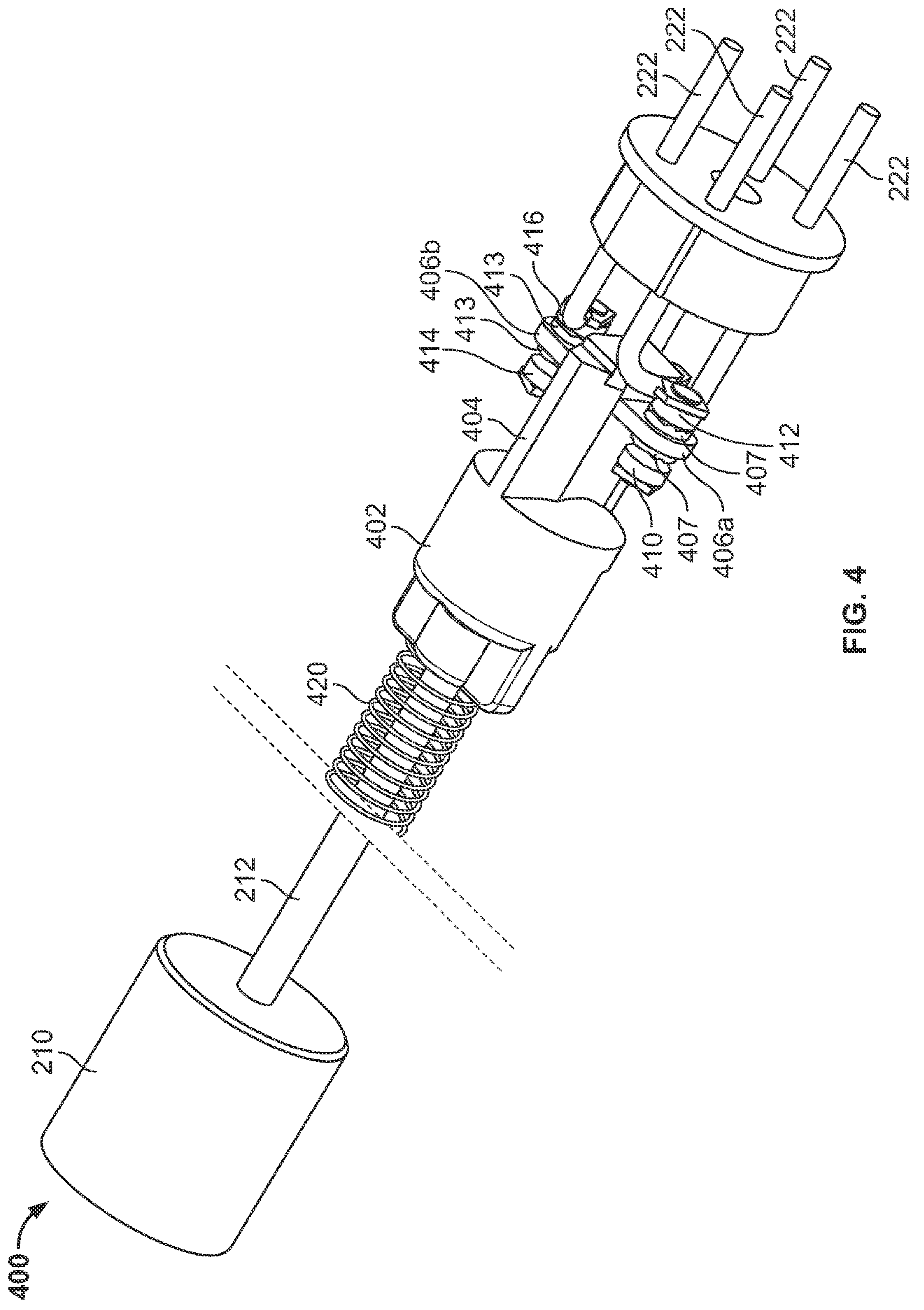
FIG. 4 illustrates an alternative example electrical switch in accordance with teachings of this disclosure.

FIG. 4 illustrates an alternative example electrical switch 400 in accordance with teachings of this disclosure. The electrical switch 400 of the illustrated example includes the magnet 210, the shaft 212, and a movable platform (e.g., a support structure) 402, which includes a support mast 404 and contact flanges 406 (hereinafter 406*a*, 406*b*, etc.). In this example, a contact 407 is mounted to the flange 406*a* and moved between contacts 410 and 412. Likewise, a contact 413 is mounted to the flange 406*b* and is moved between a contact 414 and a contact 416. In this example, the contact 407 is electrically coupled to the contact 413 via the flanges 406*a*, 406*b* and/or the movable platform 402. Also, the contacts 222 are implemented to define electrical nodes for the contacts 407, 410, 412, 413, 414, 416.

To vary electrical connections between the contacts 222, an external target causes movement of the magnet 212 and, in turn, the shaft 212. As a result, the movable platform 402 moves the support mast 404 along with the flanges 406, thereby causing the contact 407 to move away from the contact 412 and to contact and engage the contact 410. Similarly, the contact 413 is moved away from the contact 416 and to contact and engage the contact 414 during the motion of the flanges 406*a*, 406*b*.

While two sets of contacts are shown in the examples of FIGS. 3 and 4, any appropriate number of contact sets can be implemented instead (e.g., four, five, ten, twenty, fifty, one hundred, etc.). In some other alternative examples, the shaft 212 and/or the movable platform 402 is spring-loaded by a spring (e.g., a linear spring) 420. In some other examples, the contacts 407, 413 are moved by the movable platform 402 between being in contact with a corresponding electrical circuit contact (e.g., a contact associated with a closed electrical circuit) and a non-terminated contact (e.g., an open circuit, a circuit that is always open).

Figure 5A:
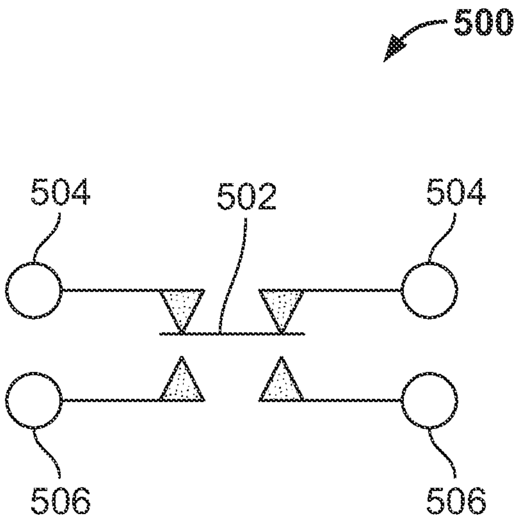
FIGS. 5A-5C illustrate schematics of example switch types that can be implemented with examples disclosed herein.
Figure 5B:
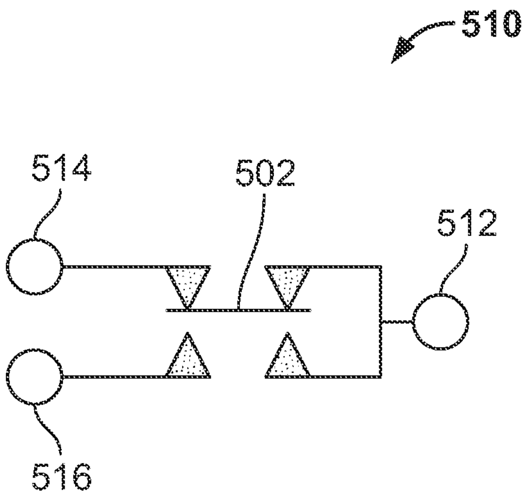
Figure 5C:
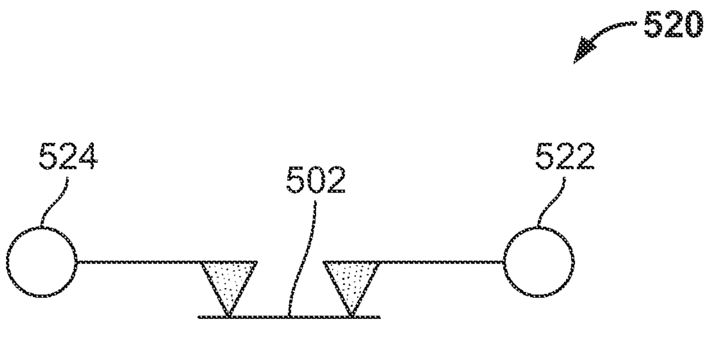

FIGS. 5A-5C illustrate schematics of example switch types and/or configurations that can be implemented with examples disclosed herein. In particular, the example switch types and/or configurations of FIGS. 5A-5C can be implemented with the electrical switches 300, 400 shown in FIGS. 3 and 4, respectively. Turning to FIG. 5A, a double-make double-break switch 500 is shown. In this example, a bridge 502 is shown between first nodes 504 and second nodes 506. In this example, the bridge 502 is moved between electrically coupling the first nodes 504 or the second nodes 506.

FIG. 5B depicts an example single-pole double-throw switch 510 that can be implemented in examples disclosed herein. In this example, the bridge 502 is moved to either electrically couple a node 512 to either a node 514 or a node 516.

Turning to FIG. 5C, a single-pole single-throw switch 520 that can be implemented in examples disclosed herein is depicted. In the illustrated example, the bridge 502 is moved between electrically coupling nodes 522, 524 or opening a circuit therebetween.

The example switch configurations 500, 510, 520 of FIGS. 5A-5C, respectively, are only examples and any appropriate switch configuration type (e.g., a double-make double-break switch) can be implemented instead.

Figure 6:
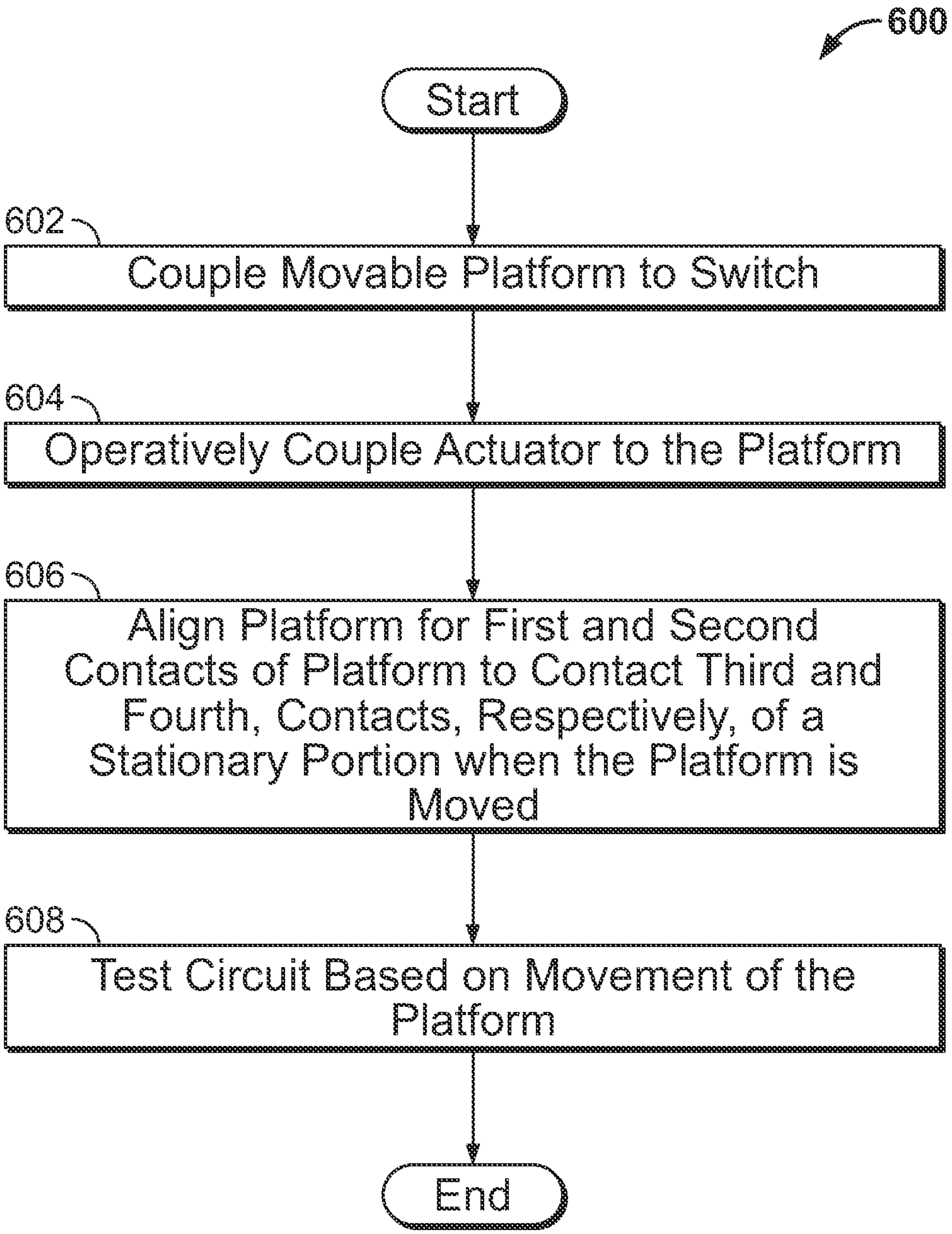
FIG. 6 is a flowchart representative of an example method can be implemented to produce and/or manufacture examples disclosed herein.

FIG. 6 is a flowchart representative of an example method 600 can be implemented to produce and/or manufacture examples disclosed herein. In this example, a magnetic proximity detection sensor switch is being produced without an electrical braid.

At block 602, a movable platform (e.g., the movable platform 301, the movable platform 402) is coupled to a switch. In this example, the movable platform is configured to move (e.g., rotationally move, translate, etc.) within the switch. Further, the movable platform is to move relative to a stationary portion of the switch.

At block 604, in some examples, an actuator (e.g., a linear actuator, a rotational actuator, a solenoid, a motor, etc.) is coupled to the movable platform. The actuator can be used to direct movement of the movable platform, for example.

At block 606, the movable platform is aligned and/or oriented to the aforementioned stationary portion. In particular, first and second contacts of the movable platform are aligned to third and fourth contacts of the stationary portion so that movement of the movable platform causes the first and second contacts to contact the third and fourth contacts, respectively. The contact and engagement of the first and second contacts with the third and fourth contacts, respectively, results in a closed electrical circuit.

At block 608, in some examples, the aforementioned circuit defined by movement of the movable platform is tested, and the process ends. In such examples, a test fixture may be used to simulate a presence of an external magnet and test the corresponding electrical functionality of the magnetic proximity detection sensor switch. Alternatively, an actuator operatively coupled to a pivot of the movable platform can be driven to test the electrical circuit.

Example 1 includes an apparatus with a movable platform having first and second contacts, where the first and second contacts electrically coupled via the movable platform, and a stationary portion having third and fourth contacts, where the movable platform is movable to bring the first and second contacts in contact with the third and fourth contacts, respectively, to simultaneously close a current path of an electrical circuit associated with the first, second, third and fourth contacts.

Example 2 includes the apparatus as defined in Example 1, further including a pivot about which the movable platform rotates to bring the first and second contacts with the third and fourth contacts, respectively.

Example 3 includes the apparatus as defined in Example 2, further including fifth and sixth contacts of the movable platform to be brought into contact with seventh and eighth contacts, respectively, of the stationary portion when the first and second contacts are moved away from the third and fourth contacts due to rotation of the movable platform about the pivot.

Example 4 includes the apparatus as defined in Example 1, where the first and second contacts electrically couple the third and fourth contacts to one another.

Example 5 includes the apparatus as defined in Example 1, where the first, second, third and fourth contacts define a single-pole single-throw switch.

Example 6 includes the apparatus as defined in Example 1, wherein the first, second, third and fourth contacts define a double-make double-break switch.

Example 7 includes the apparatus as defined in Example 1, wherein the movable platform at least partially defines a plunger to move in a linear motion path.

Example 8 includes the apparatus as defined in Example 1, further including a spring to bias the movable platform to a default position or rotation.

Example 9 includes an electrical switch having first and second contacts mounted to a movable platform, the first and second contacts electrically coupled via the movable platform. The electrical switch also includes third and fourth contacts mounted to a stationary portion, where the movable platform is movable to bring the first and second contacts in contact with the third and fourth contacts, respectively, to simultaneously close a current path of an electrical circuit associated with the first, second, third and fourth contacts.

Example 10 includes the electrical switch as defined in Example 9, further including a pivot, wherein the movable platform is to rotate about the pivot to bring the first and second contacts in contact with the third and fourth contacts, respectively.

Example 11 includes the electrical switch as defined in Example 10, further including an actuator to rotate the movable platform about the pivot.

Example 12 includes the electrical switch as defined in Example 10, further including fifth and sixth contacts of the movable platform to be brought into contact with seventh and eighth contacts, respectively, of the stationary portion when the first and second contacts are moved away from the third and fourth contacts due to rotation of the movable platform.

Example 13 includes the electrical switch as defined in Example 9, wherein the first, second, third and fourth contacts define a single-pole single throw-switch.

Example 14 includes the electrical switch as defined in Example 9, wherein the first, second, third and fourth contacts define a double-make double-break switch.

Example 15 includes the electrical switch as defined in Example 9, wherein the movable platform at least partially defines a plunger to move in a linear motion path.

Example 16 includes the electrical switch as defined in Example 9, further including a spring to bias the movable platform to a default position or rotation.

Example 17 includes a method including coupling a movable platform to an electrical switch, where the movable platform has first and second contacts, the first and second contacts electrically coupled via the movable platform, and aligning the first and second contacts to third and fourth contacts, respectively, of a stationary portion of the electrical switch so that the third and fourth contacts can be brought into contact with the first and second contacts, respectively, to simultaneously close a current path of an electrical circuit associated with the first, second, third and fourth contacts when the movable platform is moved.

Example 18 includes the method as defined in Example 17, further including operatively coupling an actuator to the movable platform.

Example 19 includes the method as defined in Example 18, further including testing the electrical circuit by driving the actuator.

Example 20 includes the method as defined in Example 17, wherein coupling the platform to the electrical switch includes coupling the movable platform to a pivot.

From the foregoing, it will be appreciated that example methods, apparatus and articles of manufacture have been disclosed that enable cost-effective and reliable switches. Further examples disclosed herein enable reduction (e.g., elimination) of electrical braids, which can be costly and time consuming to manufacture, install and adjust.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of proximity-based industrial switch application, any appropriate switch/contact application can implement examples disclosed herein.

The following claims are hereby incorporated into this Detailed Description by this reference, with each claim standing on its own as a separate embodiment of the present disclosure.

What is claimed is:

1. An apparatus comprising:

a plunger having a movable platform with first and second contacts, the first and second contacts electrically coupled via the movable platform, the plunger to move along a linear motion path;

a stationary portion having third and fourth contacts, wherein the movable platform is movable to bring the first and second contacts in contact with the third and fourth contacts, respectively, to complete a current path of an electrical circuit associated with the first, second, third and fourth contacts; and fifth and sixth contacts of the movable platform to be brought into contact with seventh and eighth contacts, respectively, of the stationary portion when the first and second contacts are moved away from the third and fourth contacts due to movement of the plunger along the linear motion path.

2. The apparatus as defined in claim 1, wherein the first and second contacts electrically couple the third and fourth contacts to one another.

3. The apparatus as defined in claim 1, wherein the first, second, third and fourth contacts define a single-pole single-throw switch.

4. The apparatus as defined in claim 1, wherein the first, second, third and fourth contacts define a double-make double-break switch.

5. The apparatus as defined in claim 1, further including a spring to bias the movable platform to a default position.

6. The apparatus as defined in claim 1, further including an electrically powered actuator to move the movable platform along the linear motion path.

7. The apparatus as defined in claim 1, wherein the first and second contacts are positioned on a flat plane of the movable platform.

8. The apparatus as defined in claim 1, wherein the fifth and sixth contacts electrically couple the seventh and eighth contacts to one another.

9. The apparatus as defined in claim 1, further including a mast, wherein the movable platform extends laterally from the mast.

10. The apparatus as defined in claim 1, wherein the first and second contacts are on opposing sides of the movable platform.

11. An electrical switch comprising:

first contacts mounted to a movable platform of a plunger that moves along a linear motion path, the first contacts electrically coupled via the movable platform;

second contacts mounted to a stationary portion, wherein the movable platform is movable to bring the first contacts in contact with the second contacts, respectively, to define a current path of an electrical circuit; and third contacts of the movable platform to be brought into contact with fourth contacts, respectively, of the stationary portion when the first contacts are moved away from the second contacts due to movement of the plunger along the linear motion path.

12. The electrical switch as defined in claim 11, further including an actuator to linearly displace the movable platform.

13. The electrical switch as defined in claim 11, wherein the contacts define a single-pole single throw-switch.

14. The electrical switch as defined in claim 11, wherein the contacts define a double-make double-break switch.

15. The electrical switch as defined in claim 11, further including a spring to bias the movable platform to a default position.

16. The electrical switch as defined in claim 11, further including an electrically powered actuator to move the movable platform along the linear motion path.

17. A method comprising:

coupling a movable platform of a plunger to an electrical switch, the plunger to move along a linear motion path, the movable platform having first and second contacts, the first and second contacts electrically coupled via the movable platform;

aligning the first and second contacts to third and fourth contacts, respectively, of a stationary portion of the electrical switch so that the third and fourth contacts can be brought into contact with the first and second contacts, respectively, to define a current path of an electrical circuit associated with the first, second, third and fourth contacts when the movable platform is moved along the linear motion path; and aligning fifth and sixth contacts of the movable platform to seventh and eighth contacts, respectively, of the stationary portion such that when the first and second contacts are moved away from the third and fourth contacts due to movement of the plunger along the linear motion path, the fifth and sixth contacts are brought into contact with the seventh and eighth contacts, respectively.

18. The method as defined in claim 16, further including operatively coupling an actuator to the movable platform.

19. The method as defined in claim 18, further including testing the electrical circuit by driving the actuator.

20. The method as defined in claim 17, wherein coupling the platform to the electrical switch includes coupling the movable platform to a spring to bias the plunger along the linear motion path.

* * * * *